(12) United States Patent
Rossman

(10) Patent No.: US 10,367,297 B2
(45) Date of Patent: Jul. 30, 2019

(54) INTEGRATED SECURING GUIDE PIN FOR AN ELECTRICAL CONNECTOR ASSEMBLY

(71) Applicant: Tyco Electronics Corporation, Berwyn, PA (US)

(72) Inventor: Jared Evan Rossman, Dover, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 550 days.

(21) Appl. No.: 14/326,807

(22) Filed: Jul. 9, 2014

(65) Prior Publication Data

US 2016/0013585 A1    Jan. 14, 2016

(51) Int. Cl.
| | |
|---|---|
| *H01R 4/64* | (2006.01) |
| *H01R 13/621* | (2006.01) |
| *F16B 35/04* | (2006.01) |
| *F16B 33/02* | (2006.01) |
| *F16B 5/02* | (2006.01) |

(52) U.S. Cl.
CPC ....... *H01R 13/6215* (2013.01); *F16B 35/044* (2013.01); *F16B 5/02* (2013.01); *F16B 33/02* (2013.01)

(58) Field of Classification Search
CPC .... H01R 13/64; H01R 13/6205; H01R 24/28; H01R 12/737; H01R 12/724; H01R 13/629; H01R 13/506
USPC ....................................................... 439/378
See application file for complete search history.

(56) References Cited

U.S. PATENT DOCUMENTS

| | | | | |
|---|---|---|---|---|
| 3,056,942 A | * | 10/1962 | Carbaugh ............ | H01R 13/516 174/359 |
| 4,865,560 A | * | 9/1989 | Thomas ............... | H01R 13/629 439/341 |
| 5,218,758 A | * | 6/1993 | Nguyen ................ | H01R 43/26 29/426.5 |
| 5,342,216 A | | 8/1994 | Davis | |
| 5,628,653 A | * | 5/1997 | Haas .................... | H01R 31/005 439/607.04 |
| 5,647,758 A | * | 7/1997 | Ichikawa ............ | H01R 13/6215 439/362 |
| 5,743,756 A | * | 4/1998 | Hasz .................. | H01R 13/4367 439/364 |
| 5,820,401 A | | 10/1998 | Hasz | |

(Continued)

OTHER PUBLICATIONS

English language translation of the search report issued for corresponding Chinese application No. 201510573597.3 dated May 28, 2018.

(Continued)

*Primary Examiner* — Jean F Duverne

(57) ABSTRACT

An integrated securing guide pin is configured to guide and securely connect an electrical connector assembly with respect to an electrical component device. The integrated securing guide pin includes a guiding member configured to guide the integrated securing guide pin into a receiving channel of a guiding connection module, and a securing member configured to securely connect to a securing surface of the guiding connection module. The securing member may be spaced from the guiding member and may be closer to an engagement head than the guiding member. The securing member may be positioned back from the distal tip at least a quarter of a length of the integrated securing guide pin.

17 Claims, 4 Drawing Sheets

(56) References Cited

U.S. PATENT DOCUMENTS

| | | | | |
|---|---|---|---|---|
| 6,074,235 | A * | 6/2000 | Brandberg | H01R 13/6275 |
| | | | | 439/378 |
| 6,273,742 | B1 | 8/2001 | Castagna | |
| 6,406,210 | B1 | 6/2002 | Parrish | |
| 6,494,734 | B1 * | 12/2002 | Shuey | 439/378 |
| 6,520,791 | B2 * | 2/2003 | Burger | 439/362 |
| 6,802,722 | B2 * | 10/2004 | Tafoya et al. | 439/79 |
| 6,802,734 | B2 * | 10/2004 | Wu | H01R 13/65807 |
| | | | | 439/362 |
| 6,805,575 | B2 * | 10/2004 | Lappohn et al. | 439/381 |
| 7,033,202 | B2 * | 4/2006 | Wu | H01R 13/6215 |
| | | | | 439/362 |
| 7,306,479 | B1 * | 12/2007 | Wu | 439/497 |
| 7,710,734 | B2 * | 5/2010 | Ice | G02B 6/4201 |
| | | | | 361/702 |
| 8,199,494 | B2 * | 6/2012 | Nguyen | H05K 7/1428 |
| | | | | 312/223.1 |
| 8,894,431 | B2 * | 11/2014 | Tiberghien et al. | 439/247 |
| 9,711,888 | B2 * | 7/2017 | Sawabe | H01R 13/512 |
| 2004/0087202 | A1 * | 5/2004 | Baccei et al. | 439/378 |
| 2007/0275604 | A1 | 11/2007 | Van Meijl et al. | |
| 2011/0256753 | A1 * | 10/2011 | Gulla | 439/378 |

OTHER PUBLICATIONS

Chinese Search Report from Second Chinese Office Action, Chinese Patent Application No. 201510573597.3, dated May 15, 2019.

* cited by examiner

INTEGRATED SECURING GUIDE PIN FOR AN ELECTRICAL CONNECTOR ASSEMBLY

BACKGROUND OF THE DISCLOSURE

Embodiments of the present disclosure generally relate to electrical connector assemblies.

Many electrical systems include one or more electrical connector assemblies that are configured to securely mate with a component device. For example, the component device may include a backplane or printed circuit board within a housing that includes one or more electrical interfaces that are configured to mate with a corresponding number of electrical connector assemblies.

Known electrical connector assemblies include a guide pin that is configured to be moved into a module of the component device. A typical guide pin includes a post that is configured to slide into a channel formed through the module, so that the connector assembly is guided into a proper aligned orientation for mating with the component device. In order to securely mate the connector assembly to the component device, separate and distinct jack screws may be used. For example, jack screws that are separate and distinct from the guide pin may be engaged to securely connect the connector assembly to the component device after the connector assembly has been guided into a proper aligned mating orientation. By engaging the jack screws within threaded channels formed in the component device, the connector assembly securely mates to the component device, and remains in a securely connected state until the jack screws are manipulated to remove the connector assembly from the component device.

As an example, a backshell connector typically mates with a component device through one or more guide pins and one or more separate and distinct jack screws. Some backshell connectors house multiple connection interfaces. The mating force used to connect the connector assemblies to reciprocal interfaces of the component device may be difficult to achieve by an individual simply manipulating the connector assemblies with respect to the component device. As such, separate and distinct jack screws are used to securely connect the backshell connector to the component device.

As noted, the guide pins of a connector assembly are separate and distinct from the jack screws. As such, the separate and distinct guide pins and jack screws occupy space within a connector assembly that could otherwise be used for other purposes. For example, the space occupied by the separate and distinct guide pins and jack screws is not able to accommodate other features, such as electrical contacts.

BRIEF DESCRIPTION OF THE DISCLOSURE

Certain embodiments of the present disclosure provide an electrical connector assembly that may include one or more first electrical contact elements and an integrated securing guide pin. The integrated securing guide pin may include a guiding member configured to guide the integrated securing guide pin into a receiving channel of a guiding connection module. The integrated securing guide pin may also include a securing member configured to securely connect to a securing surface of the guiding connection module. An electrical component device may include one or more second electrical contact elements configured to mate with the one or more first electrical contact elements, and the guiding connection module.

The guiding member may include a beveled leading guiding tip extending from a shaft that connects to the securing member. The securing member may include a threaded outer surface, while the securing surface may include a threaded interior surface. The securing member is set back from the guiding member, such that the guiding member enters a receiving channel of the guiding connection module before the securing member. The guiding member may first guide the integrated securing guide pin into the module, while the securing member securely connects the integrated securing guide pin to the module after being guided and aligned into position by the guiding member. In at least one embodiment, a diameter of the securing member is greater than a diameter of the guiding member.

The integrated securing guide pin may be integrally molded and formed as a single piece. For example, the securing member and the guiding member may both be part of a single, unitary construction that may be molded and formed as a single piece of metal or plastic.

The integrated securing guide pin may also include an engagement head configured to be engaged to secure the securing member to the securing surface of the guiding connection module.

In at least one embodiment, the securing member extends from a proximal end of the guiding member to the engagement head. In at least one embodiment, the securing member includes a plurality of securing segments separated by one or more gaps.

Certain embodiments of the present disclosure provide an integrated securing guide pin configured to guide and securely connect an electrical connector assembly with respect to an electrical component device. The integrated securing guide pin may include an engagement head at a proximal end, and a guiding member proximate to a distal tip. The guiding member may be configured to guide the integrated securing guide pin into a receiving channel of a guiding connection module. The integrated securing guide pin may also include a securing member configured to securely connect to a securing surface of the guiding connection module. The securing member may be spaced from the guiding member and may be closer to the engagement head than the guiding member. The securing member may be positioned back from the distal tip at least a quarter of a length of the integrated securing guide pin.

DETAILED DESCRIPTION OF THE DISCLOSURE

Embodiments of the present disclosure provide an integrated securing guide pin that is configured to guide a connector assembly into an aligned orientation with a component device, as well as securely connect the connector assembly to the component device.

Figure 1:
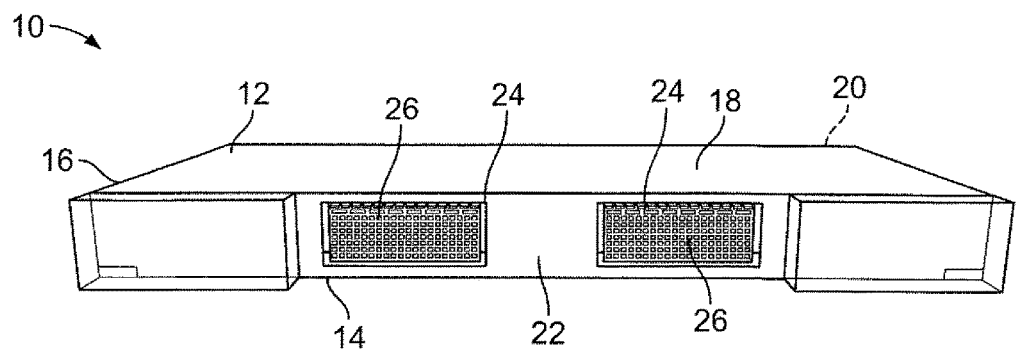
FIG. 1 illustrates a perspective front view of an electrical component device, according to an embodiment of the present disclosure.

FIG. 1 illustrates a perspective front view of an electrical component device 10, according to an embodiment of the present disclosure. The electrical component device 10 may be interconnected to other electronic devices and peripheral systems through electrical connector assemblies. The electrical component device 10 may be or include a backplane, one or more printed circuit boards (PCB), and/or the like.

The electrical component device 10 may include a housing 12 having a base 14 connected to lateral walls 16, which, in turn, connect to a top wall 18. A rear wall 20 extends between rear edges of the top wall 18, the lateral walls 16, and the base 14. A front face 22 extends from front edges of the top wall 18, the lateral walls 16, and the base 14. Connection interfaces 24 are formed through the front face 22. The connection interfaces 24 may include a plurality of electrical contact elements 26, such as contact pins, plugs, receptacles, or the like, that are configured to electrically mate with reciprocal contact elements within electrical connector assemblies. As shown, the electrical component device 10 includes two connection interfaces 24, but more or less connection interfaces 24 may be used.

Figure 2:
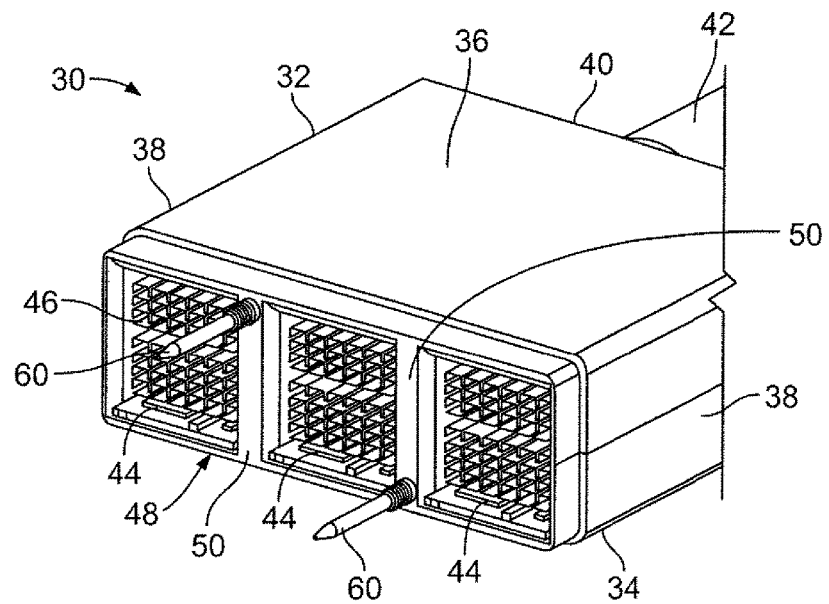
FIG. 2 illustrates a perspective front view of an electrical connector assembly, according to an embodiment of the present disclosure.

FIG. 2 illustrates a perspective front view of an electrical connector assembly 30, according to an embodiment of the present disclosure. The electrical connector assembly 30 is configured to mate with the electrical component device 10 at or within a connection interface 24 (shown in FIG. 1). The electrical connector assembly 30 includes a main housing 32 having a lower wall 34 connected to a parallel upper wall 36 by lateral walls 38, which may be perpendicular to the lower and upper walls 34 and 36. A rear wall 40 extends from rear edges of the lower wall 34, the upper wall 36, and the lateral walls 38. An insulated electrical cable 42 housing one or more electrical wires, leads, or the like, extends outwardly from the rear wall 40. The electrical cable 42 connects the electrical wires, leads, or the like to electrical contact elements 44, such as pins, plugs, receptacles, or the like, secured within an interior chamber 46 defined between interior surfaces of the lower wall 34, the upper wall 36, the lateral walls 38, and the rear wall 40. An open front interface 48 of the electrical connector assembly 30 exposes contacting portions of the electrical contact elements 44 so that they may electrically mate with reciprocal electrical contact elements 26 of the electrical component device 10 (shown in FIG. 1).

Support members 50, such as ribs, beams, panels, or the like, may extend from the upper wall 36 to the lower wall 34 at the front interface 48. The support members 50 may be parallel with the lateral walls 38. The support members 50 may separate the electrical contact elements 44 into defined groups, sections, areas, or the like. As shown, the electrical connector assembly 30 may include two support members 50. Alternatively, more or less support members 50 may be used. For example, the electrical connector assembly 30 may not include any support members 50.

Integrated securing guide pins 60 extend from the front interface 48. As shown, one of the securing guide pins 60 extends from an upper portion of one of the support members 50, while the other of the securing guide pins 60 extends from a lower portion of another of the support members 50. Alternatively, more or less securing guide pins 60 may be located at various other portions of the electrical connector assembly 30. For example, two securing guide pins 60 may extend from the upper wall 36, while one securing guide pin 60 may extend from the lower wall 34. Also, alternatively, one or more securing guide pins 60 may extend from the lateral walls 38. The integrated securing guide pins 60 are configured to guide the electrical connector assembly 30 into proper mating alignment with the electrical component device 10 (shown in FIG. 1) and securely connect the electrical connector assembly 30 to the electrical component device 10.

As described below, the electrical component device 10 may include one or more guiding connection modules that are configured to receive the integrated securing guide pin(s) 60. Alternatively, the electrical component device 10 may include the integrated securing guide pin(s) 60, while the electrical connector assembly 30 includes the guiding connection module(s).

Figure 3:
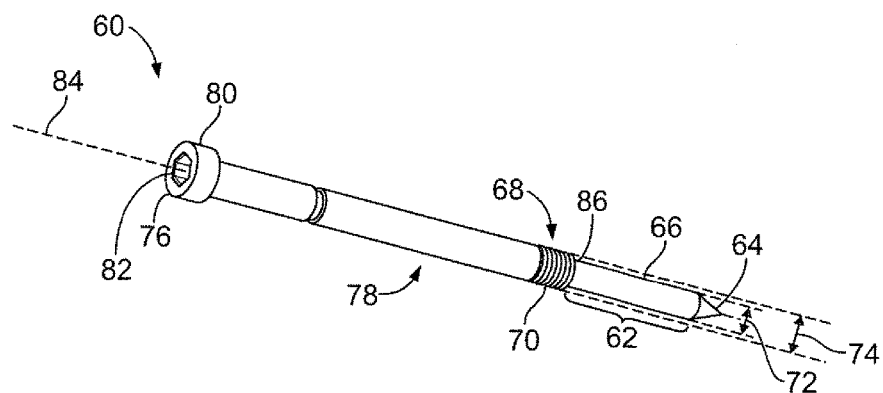
FIG. 3 illustrates a perspective view of an integrated securing guide pin, according to an embodiment of the present disclosure.

FIG. 3 illustrates a perspective view of an integrated securing guide pin 60, according to an embodiment of the present disclosure. The integrated securing pin 60 includes a guiding member 62, such as a smooth pin, post, column, or the like, having a beveled leading distal tip 64 and a shaft 66 that extends rearwardly from the leading distal tip 64. The shaft 66 connects to a securing member 68, such as a collar, flange, sleeve, ring, rim, expanded area, or the like, which may include an annular threaded outer surface 70 that is configured to securely engage a reciprocal threaded interior surface of a guiding connection module of an electrical component device. Alternatively, the securing member 68 may be or include various other engaging surfaces, such as channels, grooves, clips, snaps, or the like that are configured to securely engage reciprocal features of the guiding connection module. A diameter 72 of the guiding member 62 may be less than a diameter 74 of the securing member 68.

The securing member 68 may be set back from the guiding member 62. For example, the securing member 68 may be positioned closer to a proximal end 76 of the integrated securing guide pin 60 than the guiding member 62. The securing member 68 may be positioned back from the distal tip 64 one quarter or one third of the length of the integrated securing guide pin 60. Alternatively, the securing member 68 may be positioned at or about a midpoint of the integrated securing guide pin 60. The guiding member 62 extends forward from the securing member 68 and may be relatively long compared to the securing member 68. For example, the guiding member may be double, triple, quadruple, etc. the length of the securing member 68.

The securing member 68 may connect to an intermediate shaft 78 (opposite from the guiding member 62) that extends to the proximal end 76 of the integrated securing guide pin 60. The proximal end 76 may include an engagement head 80 having a cavity 82 that is configured to be engaged by a tool, such as a screwdriver, Allen wrench, or the like in order to rotate the integrated securing guide pin 60 about a longitudinal axis 84 so that the securing member 68 may threadably engage a reciprocal interface within a guiding connection module of the electrical component device. Alternatively, the engagement head 80 may be configured to be rotated by hand instead of with a separate and distinct tool.

As shown, the securing member 68 extends rearwardly from the guiding member 62 over a portion of the length of the integrated securing member 60. Alternatively, the securing member 68 may extend from a proximal end 86 of the guiding member 62 to the engagement head 80, or from the proximal end 86 to a portion beyond what is shown in FIG. 3. Also, alternatively, a plurality of securing member segments may extend over the intermediate shaft 78. For example, two or more securing member segments separated by smooth gaps may extend from the proximal end 86 toward the engagement head 80.

The integrated securing guide pin 60 may be integrally molded and formed as a single piece. For example, the integrated securing guide pin 60 may be a unitary piece of molded and formed metal or plastic. The securing member 68 may directly connect to the guiding member 62. The integrated securing guide pin 60 includes the securing member 68 and the guiding member 62 on a single, unitary construction. The securing member 68 is not part of a body that is separate and distinct from the guiding member 62, or vice versa.

In operation, the guiding member 62 is aligned with a receiving channel of a guiding connection module of an electrical component device. Once aligned, the integrated securing guide pin 60 is urged into the channel, such that the beveled leading distal tip 64 of the guiding member 68 guides the integrated securing guide pin 60 into the channel. The integrated securing guide pin 60 is further urged into the channel until the larger diameter securing member 68 contacts a reciprocal mating surface of the module. At this point, the engagement head 80 is engaged to threadably engage the threaded outer surface 70 of the securing member 68 with the reciprocal threaded interior surface of the guiding connection module. In this manner, the guiding member 62 guides the integrated securing guide pin 60 (and therefore the connector assembly 30 shown in FIG. 2) into position, while the securing member 68 securely connects the integrated securing guide pin 60 to the guiding connection module (and therefore securely connects the connector assembly 30 to the electrical component device).

Figure 4:
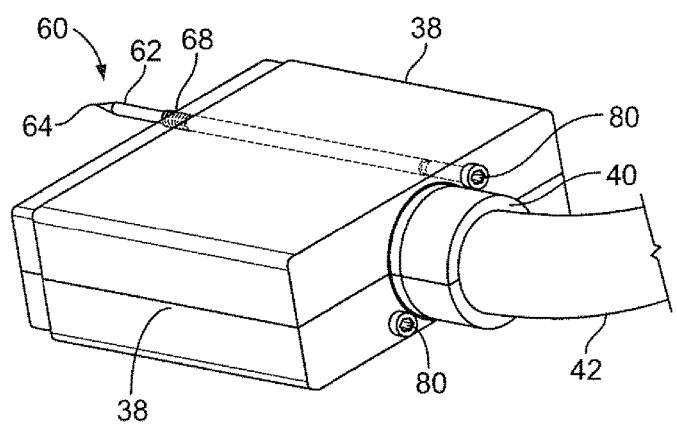
FIG. 4 illustrates a perspective rear view of an electrical connector assembly, according to an embodiment of the present disclosure.

FIG. 4 illustrates a perspective rear view of the electrical connector assembly 30, according to an embodiment of the present disclosure. As shown, the engagement heads 80 of the integrated securing guide pins 60 may be exposed through the rear wall 40. Accordingly, an individual may engage the engagement heads 80 with a tool or by hand to rotate the integrated securing guide pins 60 to securely mate the securing members 68 with the reciprocal features of the guiding connection module.

Figure 5:
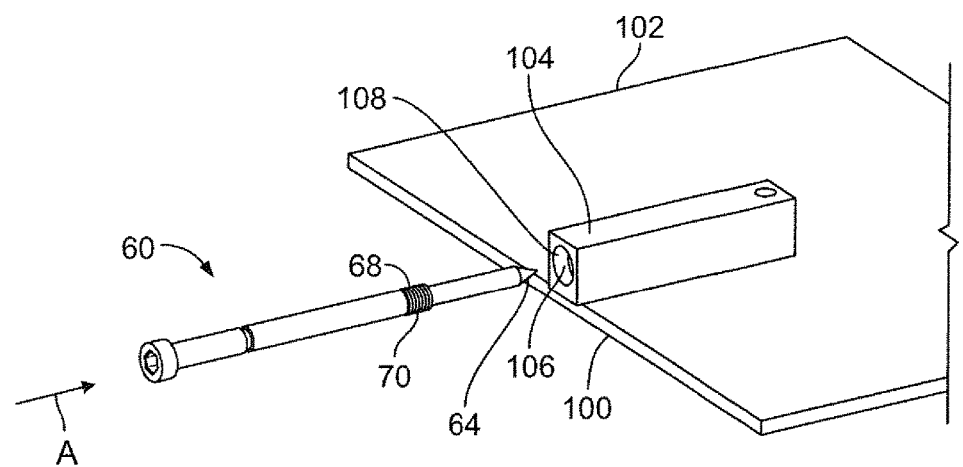
FIG. 5 illustrates a perspective view of an integrated securing guide pin aligned with a guiding connection module of an electrical component device, according to an embodiment of the present disclosure.

FIG. 5 illustrates a perspective view of an integrated securing guide pin 60 aligned with a guiding connection module 100 of an electrical component device 102, according to an embodiment of the present disclosure. As noted, the integrated securing guide pin 60 may be positioned on or within an electrical connector assembly, such as the electrical connector assembly 30 shown in FIGS. 2 and 4. Alternatively, the integrated securing guide pin 60 may be positioned on or within the electrical component device 102, while the guiding connection module 100 may be positioned on or within the electrical connector assembly.

The guiding connection module 100 includes a housing 104 having a receiving channel 106, which may include an inwardly-directed funnel 108. The funnel 108 allows the beveled leading guide tip 64 to automatically guide and center the integrated securing guide pin 60 into the guiding connection module 100 as the integrated securing guide pin 60 is urged into the receiving channel 106 in the direction of arrow A. For example, as the guide tip 64 moves into the funnel 108 and the integrated securing guide pin 60 is urged in the direction of arrow A, the funnel 108 forces the guide tip 64 towards a center of the receiving channel 106.

Figure 6:
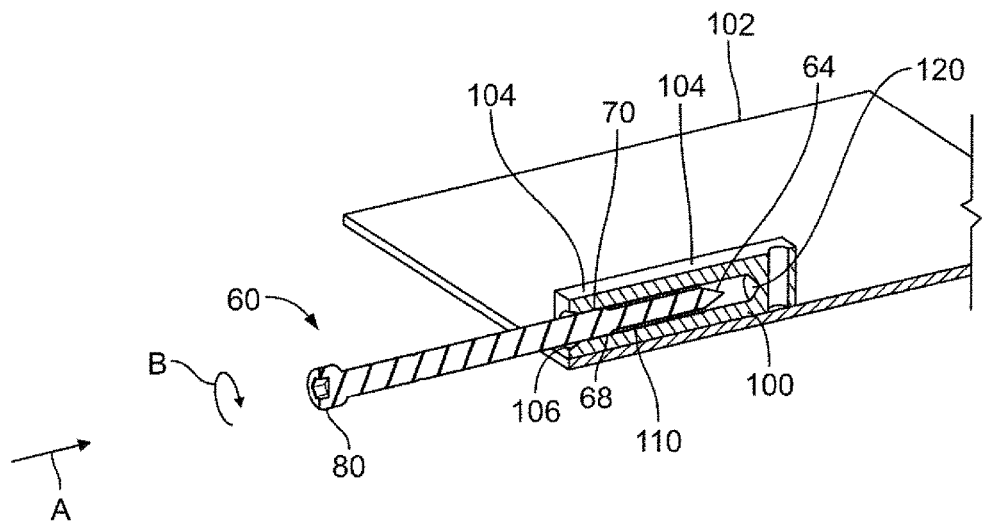
FIG. 6 illustrates a perspective transverse cross-sectional view of an integrated securing guide pin securely connected to a guiding connection module of an electrical component device, according to an embodiment of the present disclosure.

FIG. 6 illustrates a perspective transverse cross-sectional view of the integrated securing guide pin 60 securely connected to the guiding connection module 100 of the electrical component device 102, according to an embodiment of the present disclosure. Referring to FIGS. 5 and 6, when the securing member 68 contacts an interior securing surface, such as interior threads 110, formed within the receiving channel 106, the engagement head 80 may be engaged by an individual to rotate the integrated securing guide pin 60 in the direction of arc B, so that the threaded outer surface 70 of the securing member 68 threadably engages the interior threads, thereby drawing the integrated securing guide pin 60 further into the guiding connection module 100 and securely connecting the integrated securing guide pin 60 to the guiding connection module 100 (and therefore securely connecting the electrical connector assembly to the electrical component device 102).

The receiving channel 106 may be sized so that when the securing member 68 fully engages the interior threads 110, the beveled leading guide tip 64 abuts into an interior barrier wall 120 of the guiding connection module 100. Alternatively, the progress of the integrated securing guide pin 60 in the direction of arrow A may be halted by the physical connection of the electrical contacts of the electrical connector assembly with the reciprocal electrical contacts of the electrical component device 102, for example.

Figure 7:
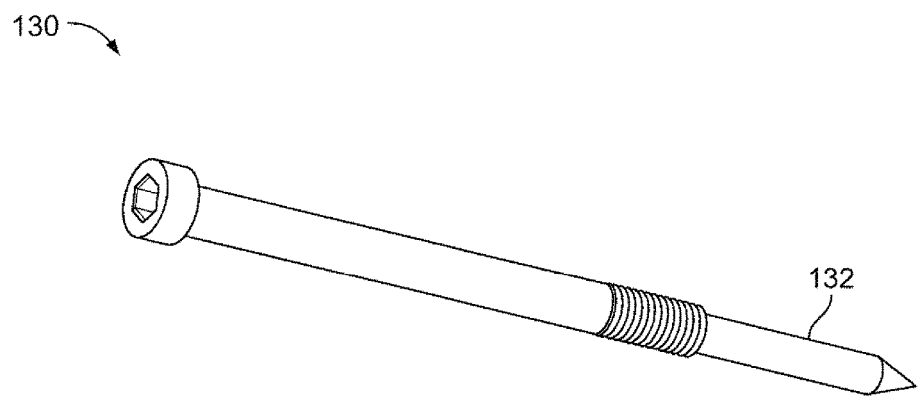
FIG. 7 illustrates a perspective front view of an integrated securing guide pin, according to an embodiment of the present disclosure.

FIG. 7 illustrates a perspective front view of an integrated securing guide pin 130, according to an embodiment of the present disclosure. The integrated securing guide pin 130 is similar to the integrated securing guide pin 60 shown in FIG. 3, except that the integrated securing guide pin 130 includes a guiding member 132 that does not include a beveled leading guiding tip.

Figure 8:
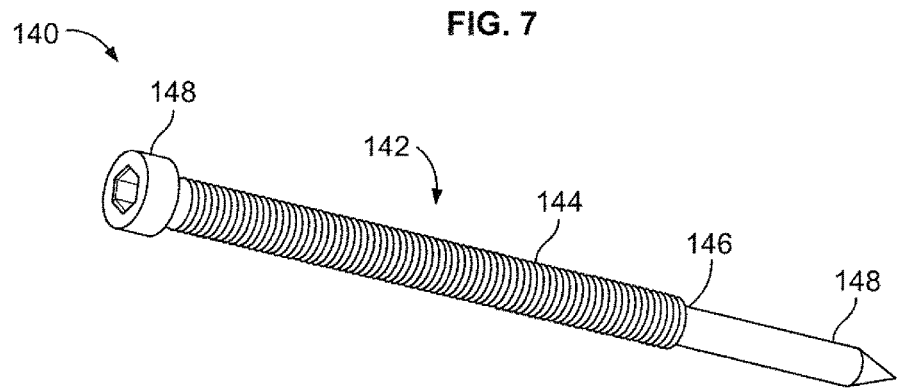
FIG. 8 illustrates a perspective front view of an integrated securing guide pin, according to an embodiment of the present disclosure.

FIG. 8 illustrates a perspective front view of an integrated securing guide pin 140, according to an embodiment of the present disclosure. The integrated securing guide pin 140 is similar to integrated securing guide pin 60 shown in FIG. 3, except that the integrated securing guide pin 140 includes a securing member 142 that includes an outer threaded surface 144 that extends from a proximal end 146 of a guiding member 148 to an engagement head 148.

Figure 9:
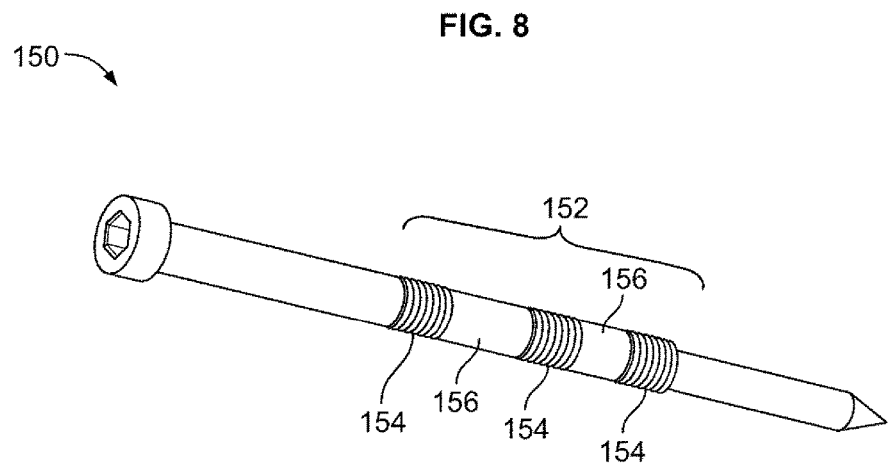
FIG. 9 illustrates a perspective front view of an integrated securing guide pin, according to an embodiment of the present disclosure.

FIG. 9 illustrates a perspective front view of an integrated securing guide pin 150, according to an embodiment of the present disclosure. The integrated securing guide pin 150 is similar to the integrated securing guide pin 60 shown in FIG. 3, except that the integrated securing guide pin 150 includes a securing member 152 having a plurality of securing segments 154 (such as outer threaded surfaces) separated by smooth gaps 156. More or less than three securing segments 154 may be used.

Thus, embodiments of the present disclosure provide an integrated securing guide pin that includes a guiding member and a securing member in a single, unitary construction. A connector assembly and/or the electrical component device may not utilize guide pins that are separate and distinct from jack screws. Instead, the integrated securing guide pin and reciprocal guiding connection module allow space for other features, such as electrical contacts.

While various spatial terms, such as upper, bottom, lower, mid, lateral, horizontal, vertical, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosure without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112(f), unless and until such claim limitations expressly use the phrase "means for" followed by a statement of function void of further structure.

What is claimed is:

1. An electrical connector assembly, comprising:
one or more first electrical contact elements and an integrated securing guide pin, wherein the integrated securing guide pin includes a guiding member that guides the integrated securing guide pin into a receiving channel of a guiding connection module, and a securing member that securely connects to a securing surface of the guiding connection module, wherein the guiding member extends forward from the securing member, wherein the securing member includes a plurality of securing segments separated by one or more gaps.

2. The electrical connector assembly of claim 1, wherein the guiding member includes a beveled leading guiding tip extending from a shaft that connects to the securing member.

3. The electrical connector assembly of claim 1, wherein the securing member includes a threaded outer surface, and wherein the securing surface includes a threaded interior surface.

4. The electrical connector assembly of claim 1, wherein the integrated securing guide pin is integrally molded and formed as a single piece.

5. The electrical connector assembly of claim 1, wherein the securing member is set back from the guiding member.

6. The electrical connector assembly of claim 1, wherein a diameter of the securing member is greater than a diameter of the guiding member.

7. The electrical connector assembly of claim 1, wherein the integrated securing guide pin includes an engagement head that is engaged to secure the securing member to the securing surface of the guiding connection module.

8. The electrical connector assembly of claim 7, wherein the securing member extends from a proximal end of the guiding member to the engagement head.

9. An integrated securing guide pin that guides and securely connects an electrical connector assembly with respect to an electrical component device, the integrated securing guide pin comprising:
an engagement head at a proximal end;
a guiding member proximate to a distal tip, wherein the guiding member guides the integrated securing guide pin into a receiving channel of a guiding connection module; and
a securing member that securely connects to a securing surface of the guiding connection module, wherein the securing member is spaced from the guiding member and is closer to the engagement head than the guiding member, wherein the securing member extends from the guiding member to the engagement head, wherein the securing member is positioned back from the distal tip at least a quarter of a length of the integrated securing guide pin, and wherein the engagement head is engaged to secure the securing member to the securing surface of the guiding connection module.

10. The integrated securing guide pin of claim 9, wherein the guiding member includes a beveled leading guiding tip at the distal tip that extends from a shaft that connects to the securing member.

11. The integrated securing guide pin of claim 9, wherein the securing member includes a threaded outer surface, and wherein the securing surface includes a threaded interior surface.

12. The integrated securing guide pin of claim 9, wherein the integrated securing guide pin is integrally molded and formed as a single piece.

13. The integrated securing guide pin of claim 9, wherein the securing member is set back from the guiding member, and wherein the guiding member is configured to enter the receiving channel before the securing member.

14. The integrated securing guide pin of claim 9, wherein a diameter of the securing member is greater than a diameter of the guiding member.

15. The integrated securing guide pin of claim 9, wherein the securing member includes a plurality of securing segments separated by one or more gaps.

16. An electrical connector assembly, comprising:
one or more first electrical contact elements and an integrated securing guide pin, wherein the integrated securing guide pin includes:
a guiding member that guides the integrated securing guide pin into a receiving channel of a guiding connection module;
a securing member that securely connects to a securing surface of the guiding connection module, wherein the guiding member extends forward from the securing member; and
an engagement head that is engaged to secure the securing member to the securing surface of the guiding connection module, wherein the securing member extends from a proximal end of the guiding member to the engagement head.

17. An integrated securing guide pin that guides and securely connects an electrical connector assembly with respect to an electrical component device, the integrated securing guide pin comprising:
- an engagement head at a proximal end;
- a guiding member proximate to a distal tip, wherein the guiding member guides the integrated securing guide pin into a receiving channel of a guiding connection module; and
- a securing member that securely connects to a securing surface of the guiding connection module, wherein the securing member includes a plurality of securing segments separated by one or more gaps, wherein the securing member is spaced from the guiding member and is closer to the engagement head than the guiding member, and wherein the securing member is positioned back from the distal tip at least a quarter of a length of the integrated securing guide pin.

* * * * *